E. SCHNEIDER.
SIGHTING APPARATUS.
APPLICATION FILED SEPT. 10, 1918.

1,354,851.

Patented Oct. 5, 1920.
6 SHEETS—SHEET 1.

E. SCHNEIDER.
SIGHTING APPARATUS.
APPLICATION FILED SEPT. 10, 1918.

1,354,851.

Patented Oct. 5, 1920.
6 SHEETS—SHEET 2.

E. SCHNEIDER.
SIGHTING APPARATUS.
APPLICATION FILED SEPT. 10, 1918.

1,354,851.

Patented Oct. 5, 1920.
6 SHEETS—SHEET 3.

Inventor
Eugene Schneider by
Mauro, Cameron, Lewis & Massey
Attorneys.

E. SCHNEIDER.
SIGHTING APPARATUS.
APPLICATION FILED SEPT. 10, 1918.

1,354,851.

Patented Oct. 5, 1920.
6 SHEETS—SHEET 5.

E. SCHNEIDER.
SIGHTING APPARATUS.
APPLICATION FILED SEPT. 10, 1918.
1,354,851.
Patented Oct. 5, 1920.
6 SHEETS—SHEET 6.
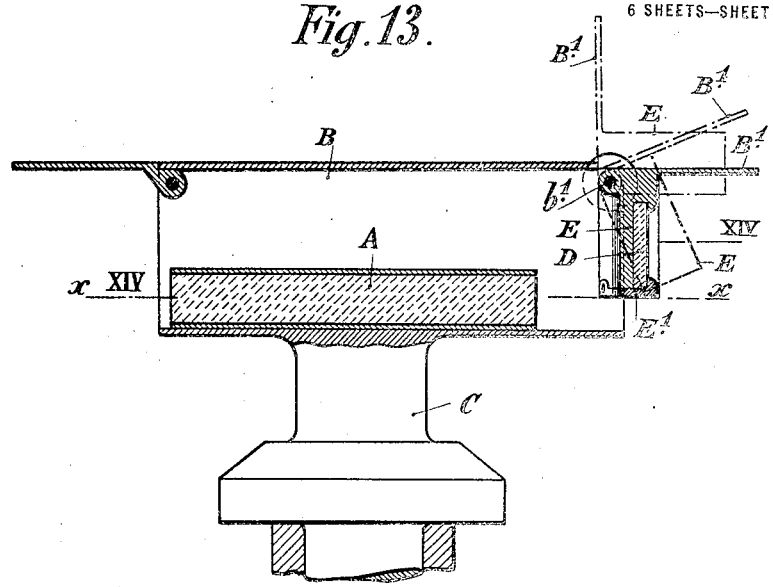
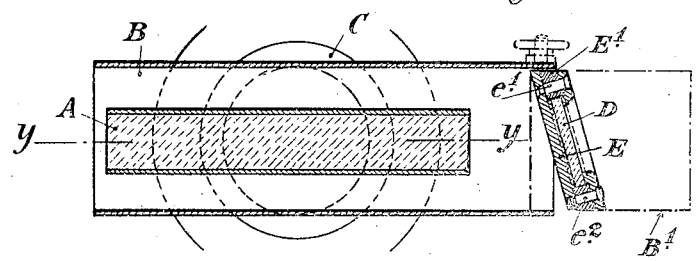
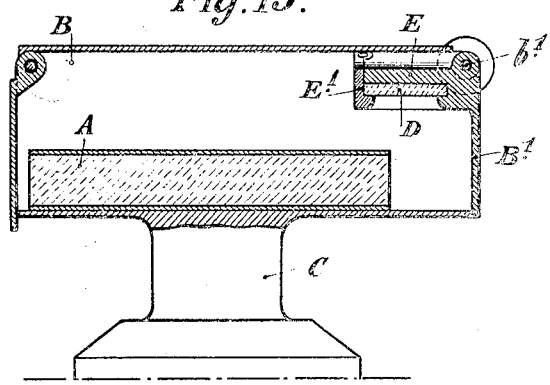
Inventor
Eugene Schneider
by Mauro, Cameron, Lewis & Massie
Attorneys.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

SIGHTING APPARATUS.

1,354,851.        Specification of Letters Patent.        Patented Oct. 5, 1920.

Application filed September 10, 1918. Serial No. 253,456.

*To all whom it may concern:*

Be it known that I, EUGÈNE SCHNEIDER, a citizen of the French Republic, and a resident of 42 Rue d'Anjou, Paris, France, have invented a new and useful Improvement in Sighting Apparatus, which invention is fully set forth in the following specification.

This invention has for its object to provide an improved apparatus designed for use in combination with collimators or other similar sighting apparatus and enabling the employment of an auxiliary object situated at the rear of the observer as a fixed point in sighting.

The improved apparatus consists of a single plane mirror located at the rear or sighting end of the collimator proper, or of the support for the latter, and which, whether fixed or retractable, is mounted in such a manner that in its position of most frequent use it is situated at right angles to the horizontal axial plane of the collimator but inclined relatively to the vertical axial plane of the latter, the vertical axis of the said mirror being in coincidence with the vertical guide line of the crossed hair lines of the collimator, while the upper or lower free edge of the mirror is situated close to the horizontal guide line of the said crossed hair lines, which is left visible.

The invention is capable of receiving a variety of mechanical expressions several of which are shown on the accompanying drawings, but it is to be expressly understood that the drawings are for the purpose of illustration only and are not to be construed as a definition of the limits of the invention, reference being had to the appended claims for that purpose.

In said drawings:

Fig. 1 is a side elevation partly in vertical section along the axis of a collimator of any suitable type and provided with the improved apparatus of the present invention.

Fig. 2 is an end elevation thereof.

Fig. 3 is a horizontal section on the line III—III of Fig. 1.

Fig. 4 is a cross section on the line IV—IV of Fig. 3.

Fig. 13 is a vertical longitudinal section of yet another embodiment of the invention, the mirror being shown in its position of use.

Fig. 14 is a horizontal section on the line XIV—XIV of Fig. 13, and

Fig. 15 shows the mirror turned down into a position wherein it is protected inside the collimator box.

In Figs. 1 to 4, A is the collimator proper, of any suitable construction, mounted in a box B, the support C of which may be combined in any suitable manner with a device for reading angles.

Figure 3:
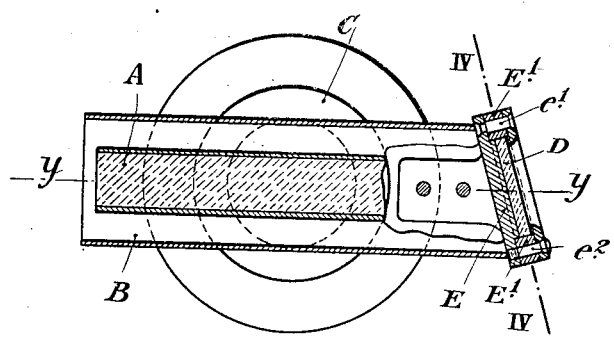
Figure 2:
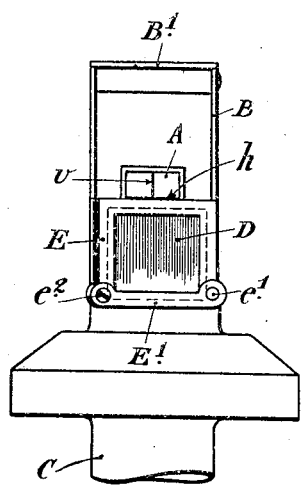
Figure 4:
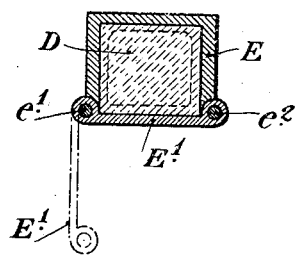
Figure 5:
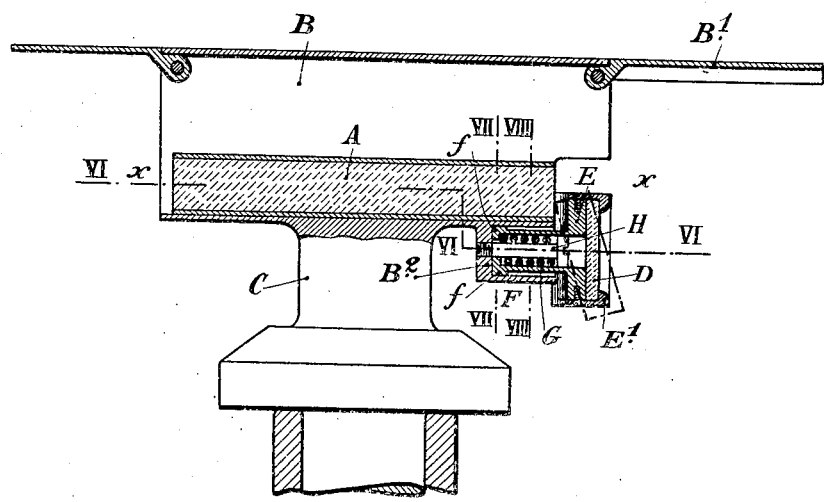
Fig. 5 is a vertical longitudinal section partly in side elevation of another embodiment of the invention.
Figure 6:
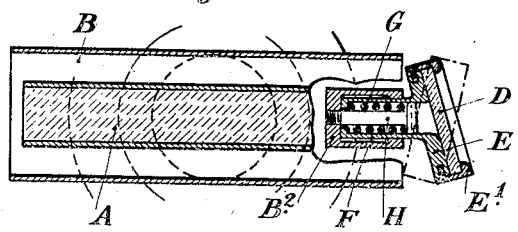
Fig. 6 is a horizontal section on the line VI—VI of Fig. 5.
Figure 7:
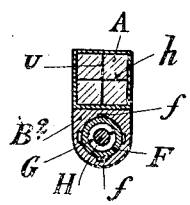
Figs. 7 and 8 are respectively sections on the lines VII—VII and VIII—VIII of Fig. 5.
Figure 8:
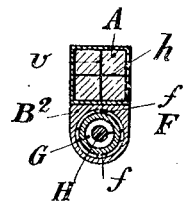
Figure 9:
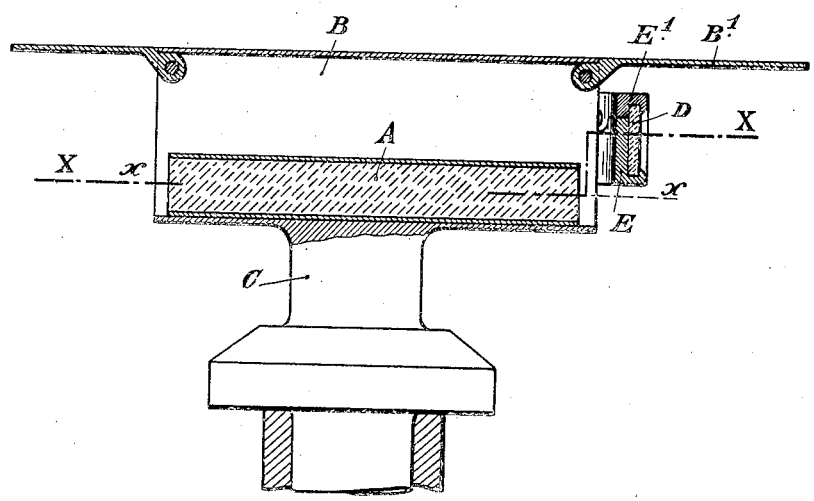
Fig. 9 is a longitudinal vertical section on the line IX—IX of Fig. 10 of a further embodiment of the invention.
Figure 10:
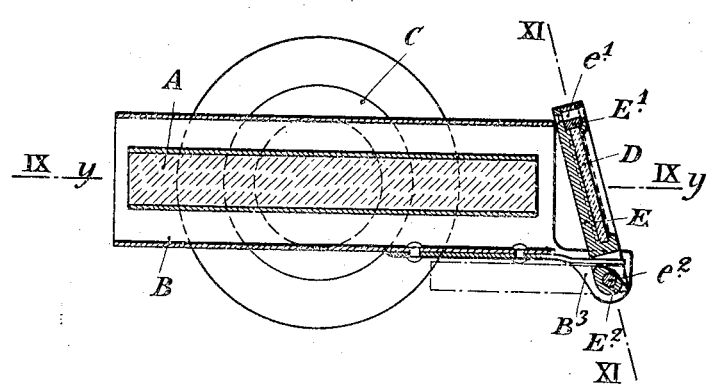
Fig. 10 is a horizontal section on the line X—X of Fig. 9.
Figure 12:
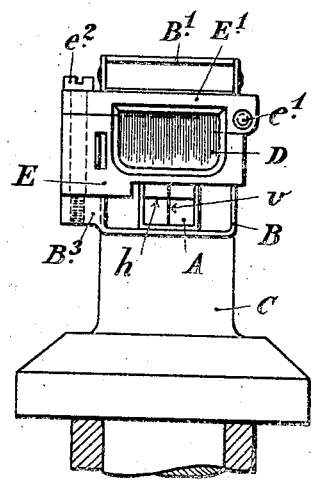
Fig. 12 is a rear end elevation.
Figure 11:
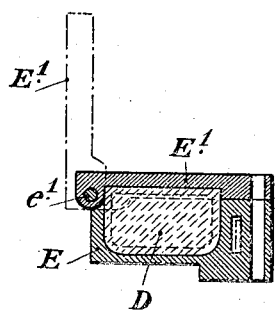
Fig. 11 is a cross section on the line XI—XI of Fig. 10.

The apparatus for utilizing a fixed point to the rear consists of a single plane mirror D, the supporting frame E of which is, in this first example, shown as fixed permanently by means of screws $e$ to the underside of the collimator box B. The mirror is mounted at the rear or sighting end of the collimator adjacent the crossed hair-lines thereof and arranged in such a manner that its plane is at right angles to the horizontal axial plane $x$—$x$ of the collimator, whereby the mirror will be in a vertical position when the longitudinal axis of the collimator is horizontal, but at the same time the plane of the mirror is inclined relatively to the vertical axial plane $y$—$y$ of the collimator as shown in Fig. 3. The position of the mirror is further such that its vertical axis coincides with the vertical guide line $v$ while a horizontal edge thereof is close to but leaves visible the horizontal guide line $h$ of the crossed hair-lines of the collimator. With this apparatus, the observer is able, on taking a sight with his right eye, to observe easily a fixed point situated behind him on his right hand, and to bring the vertical guide line of the crossed hair-lines into coincidence with the axis of said fixed point.

The frame E may be constructed in such a manner as to allow of a rapid replacement of the mirror D. For this purpose, the lower limb $E^1$ of the frame E may be hinged on an axis $e^1$ which will allow of turning it down for removing the mirror, said limb $E^1$ being secured in its position of use by means of a screw $e^2$.

Figure 1:
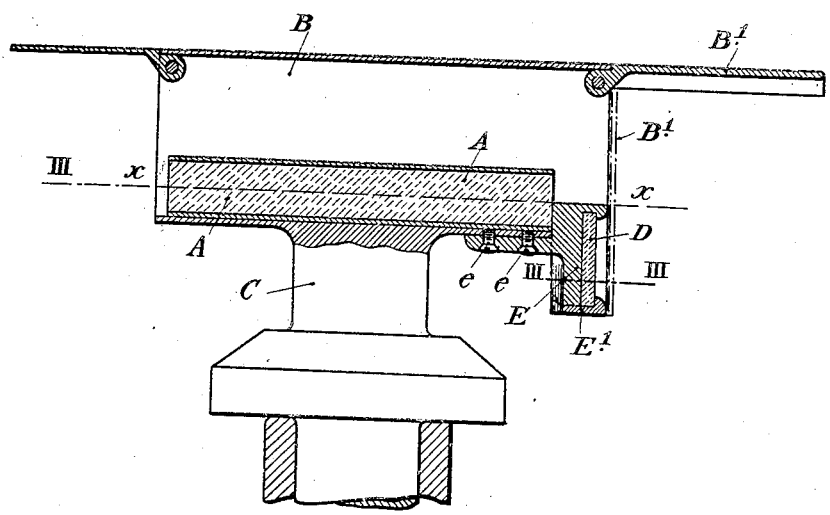
Figures 1 to 4 show one embodiment of the invention.

The rear end lid $B^1$ of the box B may be arranged in such a position and be made of such dimensions that it can serve when closed down for covering the mirror D and frame E as indicated in dot and dash lines in Fig. 1.

In the example of Figs. 5 to 8, the mirror frame E comprises an axial sleeve F the geometrical axis of which, in the position of use of the mirror, is parallel to the longitudinal axis of the collimator. By means of this sleeve F the mirror frame is adapted to engage in a corresponding socket $B^2$ shown as formed underneath the collimator box B. This arrangement, together with the location of said axis obliquely with respect to the plane of the mirror, allows of turning the mirror in its support so as to bring it at will either into the position shown in full lines in Fig. 6, or into the position indicated in dot and dash lines in the same figure. These two positions, which are symmetrical in relation to the vertical axial plane of the collimator, serve for utilizing fixed points to the rear situated respectively on the right and left of the observer. Moreover, by starting from one or other of these positions and by rotating the sleeve through 90°, the mirror can be inclined in such a manner as to receive in that position the image of a relatively elevated fixed point.

In order to fix the mirror in its different positions, the sleeve F may be made of tubular shape and have its outer surface formed with diametrically opposed ribs $f$ adapted to engage in corresponding notches formed in the inner end of the socket $B^2$ on two diameters at right angles to each other.

To retain the mirror in adjusted position, there is provided a spring G encircling a pin H and bearing at its ends respectively against the head of the said pin and the inner end of the sleeve F, serving to hold the mirror in any position to which it has been brought. The mirror can be moved into a position symmetrical to or into a position inclined to the horizontal plane, such as the position indicated in dot and dash lines in Fig. 5, by merely pulling the mirror toward the rear so as to compress the spring G and then turning it through 180° or 90°, until the ribs $f$ come again into coincidence with their coöperating notches in the inner end of the sleeve $B^2$.

In the example of Figs. 9 to 12, the mirror is made retractable by hinging the mirror frame E on a vertical hinge pin $e^2$. This arrangement allows of turning the mirror back on to one of the longitudinal sides of the box B as indicated in dot and dash lines in Fig. 10. In this position of non-use the mirror leaves the crossed hair-lines $v$—$h$ completely uncovered.

The hinge pin $e^2$ may be mounted on a plate $B^3$ fixed to the box B, and the pin may carry a cam $E^2$ having two noses for coaction with a spring for the purpose of assuring that the mirror frame E shall be held respectively in the position of use and in the position of retraction.

In the example of Figs. 13 to 15, the mirror frame E is fixed to the rear end lid $B^1$ of the collimator box B. Consequently it is hinged together with the said lid on a horizontal hinge pin $b^1$. The mirror and lid together can thus at will either be held in the position shown in full lines in Fig. 13, or be raised into one or the other of the positions indicated in dot and dash lines in the same figure. In its position shown in full lines, the mirror allows of utilizing a fixed point to the rear situated at a mean elevation, whereas in its inclined position indicated in dot and dash lines in Fig. 13, it allows of utilizing a relatively elevated fixed mark. In the position indicated in dot and dash lines wherein the mirror is horizontal, it completely uncovers the crossed hair-lines $v$—$h$. The fixing of the mirror in the positions indicated in dot and dash lines may be obtained by simply clamping together the contact surfaces (which may be fluted if required) between the operating knob of the hinge pin $b^1$ and the outer wall of the box B. The mirror and lid may also be turned down into the position shown in Fig. 15 wherein the mirror is protected inside the box B.

While the illustrated embodiments have been described in considerable detail it is to be expressly understood that the invention is not to be restricted thereto, as the same is capable of receiving a variety of mechanical expressions, some of which will readily suggest themselves to those skilled in the art. Reference is theretofore to be had to the claims hereto appended for a definition of the limits of the inventon.

What is claimed is:

1. In combination with a collimator having crossed hair-lines, a single plane mirror for utilizing a fixed sighting point to the rear mounted adjacent said crossed hair-lines at right angles to the horizontal axial plane of the collimator and inclined to the vertical axial plane of the collimator.

2. In combination with a collimator having crossed hair-lines, a single plane mirror for utilizing a fixed sighting point to the rear mounted adjacent said crossed hair-lines at right angles to the horizontal axial plane of the collimator and inclined to the vertical axial plane of the collimator, the vertical axis of the mirror being in alinement with the vertical guide line of the crossed hair lines of the collimator and a horizontal edge of the mirror being adjacent to but not covering the horizontal guide line of said crossed hair lines.

3. In combination with a collimator having crossed hair lines, a single plane mirror for utilizing a fixed sighting point to the rear mounted adjacent said crossed hair-lines at right angles to the horizontal axial plane of the collimator and inclined to the vertical axial plane of the collimator, and means mounting said mirror for movement into and out of operative position.

4. In combination with a collimator having crossed hair-lines and the collimator box, a single plane mirror for utilizing a fixed sighting point to the rear mounted adjacent said crossed hair-lines at right angles to the horizontal axial plane of the collimator and inclined to the vertical axial plane of the collimator, and a lid for the collimator box adapted to constitute a cover for the mirror.

5. In combination with a collimator, a mirror for utilizing a fixed sighting point to the rear mounted at right angles to the horizontal axial plane of the collimator and inclined to the vertical axial plane of the collimator, and a frame for said mirror comprising a pivoted limb adapted to move to a position wherein said mirror may be readily withdrawn from said frame.

6. In combination with a collimator having crossed hair-lines, a single plane mirror for utilizing a fixed sighting point to the rear mounted at the sighting end of the collimator at right angles to the horizontal axial plane of the collimator and inclined to the vertical axial plane of the collimator, a socket member carried by the collimator, and an axial member on said mirror mounted for rotation in said socket member.

7. In combination with a collimator having crossed hair-lines, a single plane mirror for utilizing a fixed sighting point to the rear mounted at the sighting end of the collimator at right angles to the horizontal axial plane of the collimator and inclined to the vertical axial plane of the collimator, a socket member carried by the collimator, an axial member on said mirror rotatably mounted in said socket member, and means for maintaining said mirror in predetermined positions.

8. In combination with a collimator having crossed hair-lines, a single plane mirror for utilizing a fixed sighting point to the rear mounted at the sighting end of the collimator at right angles to the horizontal axial plane of the collimator and inclined to the vertical axial plane of the collimator, a socket member carried by the collimator, an axial member on said mirror rotatably mounted in said socket member, and a spring maintaining said axial member in its positions of adjustment.

9. In combination with a collimator having crossed hair-lines, a single plane mirror for utilizing a fixed sighting point to the rear mounted at the sighting end of the collimator at right angles to the horizontal axial plane of the collimator and inclined to the vertical axial plane of the collimator, and means mounting said mirror whereby it may be moved to reflect images either to the right or to the left of the vertical axial plane of the collimator.

10. In combination with a collimator having crossed hair-lines, a single plane mirror for utilizing a fixed sighting point to the rear mounted at the sighting end of the collimator at right angles to the horizontal axial plane of the collimator and inclined to the vertical axial plane of the collimator, and means mounting said mirror whereby it may be adjusted to reflect a relatively elevated image.

11. In combination with a collimator having crossed hair-lines, a single plane mirror for utilizing a fixed sighting point to the rear, and means mounting the mirror at the sighting end of the collimator with the mirror at right angles to the horizontal axial plane of the collimator, said mounting means permitting movement of the mirror into and out of operative positions oppositely inclined relatively to the vertical axial plane of the collimator.

12. In combination with a collimator having crossed hair-lines, a single plane mirror for utilizing a fixed sighting point to the rear mounted at the sighting end of the collimator at right angles to the horizontal axial plane of the collimator and inclined to the vertical axial plane of the collimator, means mounting said mirror for movement into a plurality of positions, and means for clamping said mirror in any of its positions of adjustment.

13. In combination with a collimator having cross hair-lines, a single plane mirror for utilizing a fixed sighting point to the rear, and means mounting said mirror at the sighting end of the collimator with the mirror at right angles to the horizontal axial plane of collimator, said mounting means permitting movement of the mirror into and out of operative positions oppositely inclined relatively to the vertical plane of the collimator and said mounting means also permitting movement of the mirror into and out of an operative position inclined relatively to the horizontal axial plane of the collimator.

In testimony whereof I have signed this specification.

EUGÈNE SCHNEIDER.

Witnesses:
 ANDRE MOSTICKER,
 JOHN F. SIMONS.